(12) United States Patent
Jameson et al.

(10) Patent No.: US 11,627,249 B2
(45) Date of Patent: Apr. 11, 2023

(54) CAMERA SERVER FOR HETEROGENEOUS CAMERAS

(71) Applicant: IonQ Inc., College Park, MD (US)

(72) Inventors: Melissa Jameson, College Park, MD (US); Aleksey Blinov, Evanston, IL (US)

(73) Assignee: IonQ Inc., College Park, MD (US)

( * ) Notice: Subject to any disclaimer, the term of this patent is extended or adjusted under 35 U.S.C. 154(b) by 0 days.

(21) Appl. No.: 17/333,461

(22) Filed: May 28, 2021

(65) Prior Publication Data

US 2022/0385805 A1    Dec. 1, 2022

(51) Int. Cl.
*H04N 5/232* (2006.01)
*G06N 10/00* (2022.01)
*H04N 7/01* (2006.01)
*H04N 5/247* (2006.01)

(52) U.S. Cl.
CPC ......... *H04N 5/23222* (2013.01); *G06N 10/00* (2019.01); *H04N 5/247* (2013.01); *H04N 7/01* (2013.01)

(58) Field of Classification Search
CPC ...... H04N 5/23222; H04N 5/247; H04N 7/01; G06N 10/00
See application file for complete search history.

(56) References Cited

U.S. PATENT DOCUMENTS

| | | | |
|---|---|---|---|
| 6,437,330 B1* | 8/2002 | Sugiyama | H01J 37/21 250/309 |
| 9,794,495 B1* | 10/2017 | Forsblom | H04N 21/4725 |
| 2017/0339299 A1* | 11/2017 | Iki | H04N 5/23245 |

* cited by examiner

*Primary Examiner* — Mekonnen D Dagnew
(74) *Attorney, Agent, or Firm* — Butzel Long (57) ABSTRACT

Systems and techniques are provided for a camera server for heterogeneous cameras. A camera server may include a computing device that may a receive image data from a first camera and second image data from a second camera of a heterogenous system that may be a trapped ion quantum computer. The first camera may observe trapped ions. The second camera may observe optical systems and laser beams. The second image data may have a different format than the first image data. The computing device may convert the image data and the second image data into a format for a common data structure for image data, send the image data in the format for the common data structure for image data to client computing devices, and send the second image data in the format for the common data structure for image data to additional client computing devices.

21 Claims, 9 Drawing Sheets

CAMERA SERVER FOR HETEROGENEOUS CAMERAS

BACKGROUND

Trapped ion quantum computers may use cameras to monitor the quality of laser beams, the condition of the optical system, and the state of the trapped ions used by the trapped ion quantum computer. There may be several cameras in use within a trapped ion quantum computer. It may not be advisable to use cameras that are the same model from the same manufacturer using the same camera drivers to perform all of the necessary functions in a trapped ion quantum computer, as different cameras may perform different functions better than others. Mixing cameras of different models from different manufacturers in a trapped ion quantum computer so that different cameras can perform different functions may result in better performance of the cameras and may allow more flexibility in the construction and maintenance of the trapped ion quantum computer, but may present difficulties during operation.

TECHNICAL FIELD

The primary usage of the embodiments of the disclosed subject matter is in the technical field of quantum computing using trapped ions, and in particular in the management of cameras used to monitor ions, laser beams, and optical systems in trapped ion quantum computers, although the embodiments of the disclosed subject matter may be useful in other technical fields that make use of multiple camera types.

BRIEF SUMMARY

According to implementations of the disclosed subject matter, A camera server may include a computing device that may a receive image data from a first camera of a heterogenous system and receive second image data from a second camera of the heterogenous system. The second image data may have a different format than the first image data. The computing device may convert the image data and the second image data into a format for a common data structure for image data, send the image data in the format for the common data structure for image data to client computing devices, and send the second image data in the format for the common data structure for image data to additional client computing devices.

Systems and techniques disclosed herein may allow for a camera server for heterogeneous hardware. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

According to embodiments disclosed herein, a camera server for heterogeneous cameras may allow for the management of heterogenous cameras. The heterogenous cameras may be part of a heterogenous system, such as a trapped ion quantum computing device. A camera server may include a computing device that may be connected to the heterogenous cameras through any suitable connection types. The camera server may allow for control of and viewing of still images and video generated by cameras of different model types from different manufacturers through a common camera interface. The camera server may include all of the drivers necessary for the operation of the heterogenous cameras. The common camera interface may be usable on computing devices that do not have any drivers for the any of the heterogeneous cameras installed. The camera server may permit concurrent access to heterogeneous cameras from multiple computing devices. Changes to camera settings made by any computing device accessing a camera may be shared in real-time across all computing devices accessing the camera.

A camera server may be used to manage heterogeneous cameras. The heterogeneous cameras may be part of any suitable heterogenous system, such as, for example, a trapped ion quantum computing device. A trapped ion quantum computing device may, for example, include several cameras which may be used to monitor the status of the trapped ions through images of the trapped ions generated by the cameras, cameras which may be used to monitor the laser beams, and cameras which may be used to monitor the optical systems of the trapped ion quantum computer. The cameras may be heterogenous, of different model types and from different manufacturers, have different capabilities, use different drivers and libraries, having different protocols and syntax for communication, and generate output image data, such as video and still images, in different formats. For example, a trapped ion quantum computer may use a different type of camera for observing trapped ions than are used for monitoring optical systems and laser beams within the trapped ion quantum computer. The different types of cameras may, for example, be suitable for detecting different wavelengths of light and may have different sensitivity levels and different imaging resolutions. For example, the type of camera used to observe trapped ions may be very sensitive and very low noise, and may also have a low resolution, as the camera may only need to be able to detect luminosity. The type of camera used to observe trapped ions may, for example, use a scientific complementary metal oxide semiconductor (sCMOS) sensor, and have a resolution of 4 megapixels, pixels that are 6.5 μm square, and a sensitivity of 82% quantum efficiency. The type of camera used to monitor optical systems and laser beams may be less sensitive, but may have a higher resolution so that the shape of the laser beam detected by the camera can be determined. The type of camera used to monitor optical systems and laser beams may for example, use an CMOS sensor, have a resolution of 20 megapixels, pixels that are 2.5 μm square, and a sensitivity of 65% quantum efficiency.

The heterogeneous cameras may use any of a variety of connection types. For example, some of the cameras may use USB connections, for example, through a USB cable, to connect to and communicate with a computing device, while other cameras may use TCP connections, for example, through an ethernet cable, to connect to and communicate with a computing device.

The camera server may be implemented using any suitable computing device. The heterogenous cameras of the heterogeneous system, for example, trapped ion quantum computing device, may be connected to the camera server through any suitable connections, including, for example, TCP and USB connections. The camera server may include any necessary drivers and libraries for communicating with the heterogenous cameras, and may include different drivers and libraries for cameras of different model types and from different manufacturers. For example, if each of the heterogenous cameras is different from each of the other heterogenous cameras, the camera server may include separate drivers and libraries for each of the heterogenous cameras connected to the camera server.

The camera server may make communication with the heterogenous cameras available to other computing devices. The camera server may implement a common camera interface. The common camera interface may be accessible by other computing devices through, for example, a web browser or other client-side software. The common camera interface may allow for access to any of the heterogenous cameras of the heterogenous system that are connected to the camera server, including viewing and changing camera settings, sending instructions to cameras, and viewing video and still images from the cameras. For example, a user of a computing device connected to the camera server through, for example, a local area network connection or wide area network connection may access the common camera interface for the heterogenous cameras. The user may use the common camera interface to select a camera to interact with, view video and still images from that camera, change settings on the camera, send commands to the camera, and perform image processing on images from the camera. For example, the user may use the common camera interface to select and name areas, or regions of interest, in images from a camera, change the viewport, perform brightness and contrast adjustment on an image, and run various forms of feature detection on an image to detect features of interest, such as, for example, locating trapped ions within an image. The regions of interest may be used, for example, to indicate areas of images from cameras of a trapped ion quantum computer that should be subject to special analysis, such as blob detecting, to determine how many ions are present in the region of interest. The common camera interface may be used to view a real-time video feed from a camera, which may, for example, allow for visual identification of effects of changes made to the heterogenous system that includes the camera.

Communication with the cameras may be handled by the camera server, including any processing of still and video images from the camera, instead of being handled client-side by the computing device used to access the common camera interface. This may permit computing devices with less computational resources to be used to access the common camera interface, as the camera server may be implemented using a computing device with more computational resources that may be able to more efficiently perform image processing and feature detection tasks. The camera server may normalize the input to and output from the heterogenous cameras into similar data structures across the heterogenous cameras. The image data from the heterogenous camera may be converted by the camera server into a format for a common data structure, so that all of the image data sent to the common camera interface may be in the format of the common data structure regardless of the format used to generate the image data. The camera server may include a database that maps camera settings parameters across the heterogenous cameras to common settings. The common settings may include settings common to the operation of cameras, such as ISO, white balance, f-stop, exposure length, zoom, focal length, the portion of the camera sensor area to capture, binning, trigger source, shutter speed, and any other suitable settings and parameters. This may allow for the camera server to present a common camera interface with a single set of controls for adjusting camera settings and parameters that encompass the common settings for cameras when the cameras use different camera-specific settings parameters for the same setting type. Changes to a common setting for a camera made using the common camera interface may then be mapped to the actual settings or parameters for the specific camera whose settings are being changed by the camera server, which may then be able to communicate with the camera, using any necessary drivers and libraries for the camera, to adjust the appropriate settings and parameters in the accordance with the change made to the common setting using the common camera interface. Users, and the user's computing device, may not need to be aware of the specific camera that is being interacted with through the common camera interface, or any of the camera-specific settings or parameters, as the camera server may handle the communication in a manner appropriate to the camera being interacted with. The common camera interface may allow the user, and user's computing device, to interact with heterogenous cameras as if they were homogenous. The mapping of changes to a common setting to the actual settings and parameters for a specific camera may be done on a low-level, for example, directly instructing the changes necessary to the operation of the camera hardware. The camera server may also handle video compression and network traffic handling for the heterogenous cameras.

The camera server may permit concurrent access to cameras. Multiple different computing devices may access the same camera at the same time using the common camera interface provided by the camera server. The different computing devices may all view real-time images from the camera from endpoints, for example, TCP endpoints, established by the camera server for each camera that may host the image data generated by the camera in the format for the common data structure. When a setting of a camera that is being accessed by multiple computing devices is changed through the common camera interface on one of the computing devices, the change may be propagated in real-time to the instances of the common camera interface on the other computing devices. The connection between the computing devices that access the common camera interface and the camera server may be made using a communications protocol that allows for full duplex communications, such as, for example, full-duplex TCP protocol such as Web Socket. The use of full-duplex communications may allow the camera server to push updates to a camera's settings and parameters to instances of the common camera interface open on other computing devices without waiting for the instances of the common camera interface on the other computing devices to poll the camera server for such changes. This may allow, for example, a change to a camera's setting made on an instance of the common camera interface running in the web browser of a first computing device to be more rapidly propagated by the camera server to instances of the common camera interface running on a second and third computing device, as the camera server does not need to wait for the second and third computing devices to poll for changes to the camera's settings, and can instead push data that will cause the common camera interface to display the changed settings as soon as the change in settings is received from the first computing device. Users may thus always be apprised of the most recent changes to settings for a camera they are accessing through the common camera interface, preventing a user from changing a setting because they unaware of the actual current status of the setting.

In some implementations, the heterogeneous cameras may be part of a heterogenous system other than a trapped ion quantum computer, such as, for example, security systems, control systems, or any other system that may use multiple cameras of different types.

Figure 1:
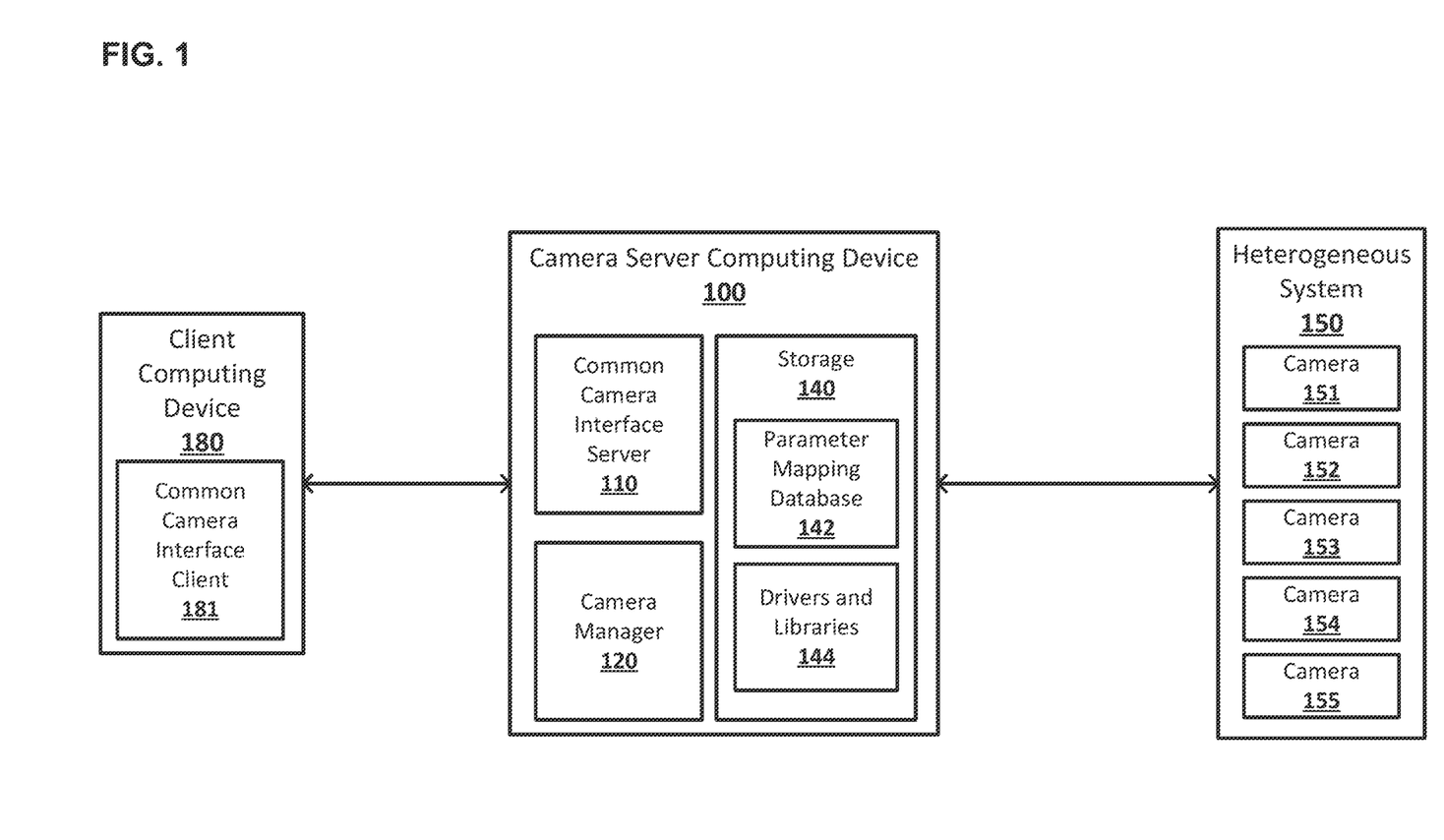
FIG. 1 shows an example system suitable for a camera server for heterogeneous cameras according to an implementation of the disclosed subject matter.

FIG. 1 shows an example system suitable for a camera server for heterogeneous cameras according to an implementation of the disclosed subject matter. A camera server computing device 100 may include a common camera interface server 110, camera manager 120, and a storage 140. The camera server computing device 100 may be any suitable device, such as, for example, a computer such as the computer 20 as described in FIG. 8. The camera server computing device 100 may be a single computing device, or may include multiple connected computing devices, and may be, for example, a laptop, a desktop, an individual server, a server farm, or a distributed server system, or may be a virtual computing device or system. The common camera interface server 110 may be any suitable combination of hardware and software on the camera server computing device 100 for serving a common camera interface to client computing devices. The camera manager 120 may be any suitable combination of hardware and software on the camera server computing device 100 for managing heterogenous cameras of a heterogenous system. The storage 140 may be any suitable combination of hardware and software on or accessible to the camera server computing device 100 for implementing any suitable combination of volatile and non-volatile storage.

Figure 10:
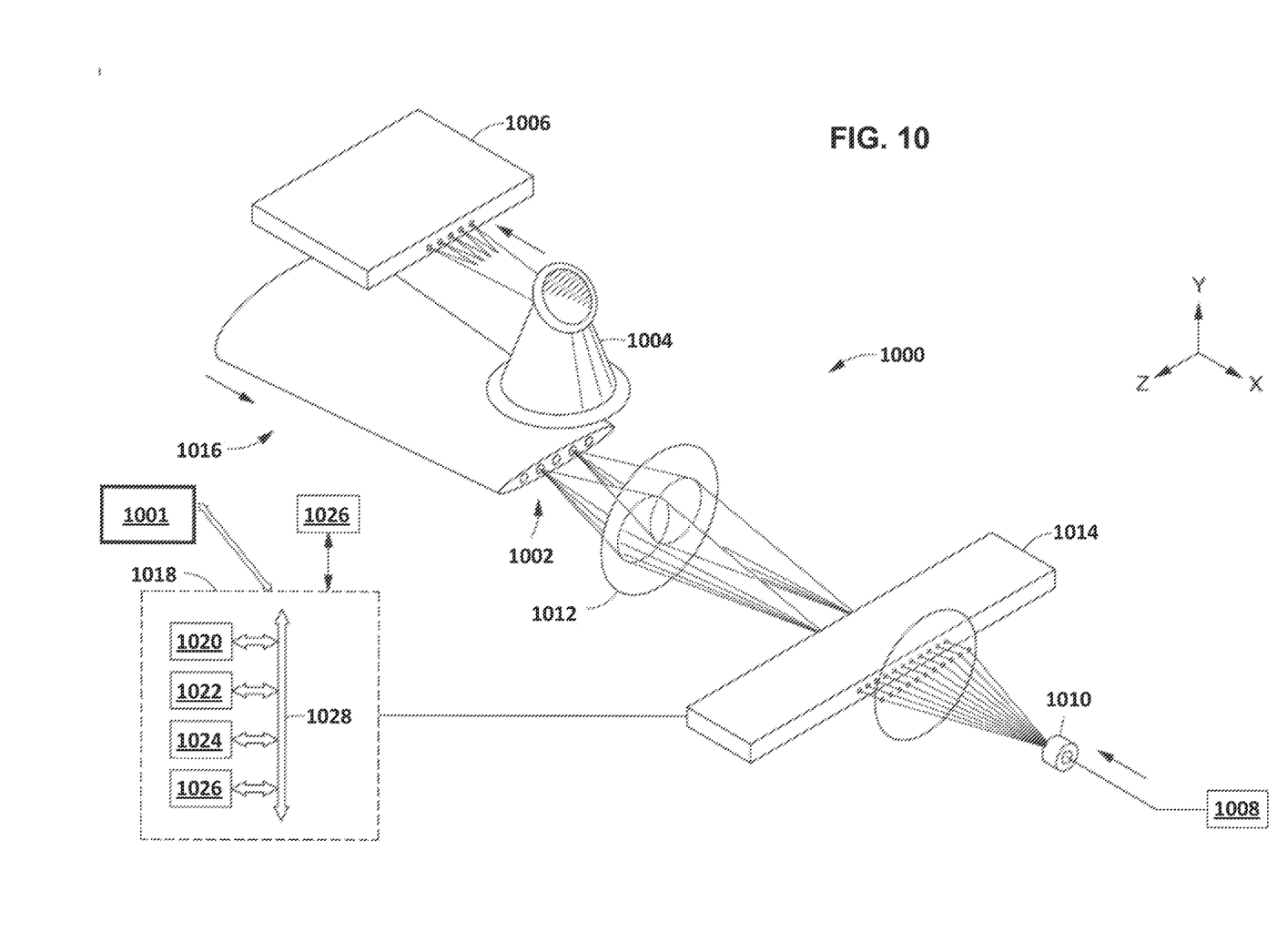
FIG. 10 shows a partial view of an ion trap quantum computer according to an embodiment of the disclosed subject matter.

A heterogenous system 150 may be a system or device that includes any number of heterogenous devices. The heterogenous system 150 may be, for example, a trapped ion quantum computing device, such as the trapped ion quantum computer, or system, 1000 as depicted in FIG. 10. The heterogenous system 150 may include, among the heterogenous devices, a number of heterogenous cameras, for example, cameras 151, 152, 153, 154, and 155, which may be heterogenous cameras of any model types from any manufacturers. The cameras 151, 152, 153, 154, and 155 may, for example, be cameras used to observe the trapped ions of a trapped ion quantum computer such as the system 1000, and cameras used to observe the optical systems and lasers of the trapped ion quantum computer, such as the system 1000. The cameras 151, 152, 153, 154, and 155 may be connected to the camera server computing device 100 in any suitable manner, including through USB connections directly to the camera server computing device 100 and TCP connections.

A client computing device 180 may include a common camera interface client 181, camera manager 120, and a storage 140. The camera server computing device 100 may be any suitable device, such as, for example, a computer such as the computer 20 as described in FIG. 8. The client computing device 180 may be a single computing device, or may include multiple connected computing devices, and may be, for example, a laptop, a desktop, an individual server, a server farm, or a distributed server system, or may be a virtual computing device or system. The common camera interface client 181 may be any suitable combination of hardware and software on the client computing device 180 for accessing a common camera interface served by, for example, the common camera interface server 110. The common camera interface client 181 may be, for example, web browser, or may be client software for accessing the common camera interface server 110. The client computing device 180 may be, for example a computing device used by a user to interact with the cameras 151, 152, 153, 154, and 155 of the heterogenous system 150. The client computing device 180 may connect to the camera server computing device 100 using any suitable connection, including, for example, local area and wide area network connections. The connection between the common camera interface client 181 and the common camera interface server 110 may use a full duplex communications protocol.

The camera server computing device 100 may provide access to the cameras 151, 152, 153, 154, and 155 of the heterogenous system 150 through the common camera interface server 110. The common camera interface server 110 may serve a common camera interface that may allow a user of a common camera interface client, such as the common camera interface client 181, to view and process real-time images from the cameras 151, 152, 153, 154, and 155, and to view and change settings for the cameras 151, 152, 153, 154, and 155. The user's computing device, for example, the client computing device 180, may not need to have any drivers or libraries for the cameras 151, 152, 153, 154, and 155 installed, and may be unaware the cameras 151, 152, 153, 154, and 155 are heterogenous. The camera manager 120, in conjunction with the common camera interface server 110, may manage the cameras 151, 152, 153, 154, and 155, and may make images and video from the cameras 151, 152, 153, 154, and 155 available through the common camera interface server 110 at endpoints established by the common camera interface server 110.

The storage 140 may store a parameter mapping database 142 and driver and libraries 144. The parameter mapping database 142 may be a database mapping settings and parameters for the cameras 151, 152, 153, 154, and 155 to common settings used by the common camera interface. The camera manager 120 may use the parameter mapping database 142 to determine how to change the settings or parameters of a camera of one of the cameras 151, 152, 153, 154, and 155 based on a settings change received from the common camera interface client 181 through the common camera interface server 110. This may allow for the common camera interface server 110 to present a common camera interface that looks the same, and shows the same controls for camera settings, regardless of which of the cameras 151, 152, 153, 154, and 155 is being accessed through the common camera interface client 181. The camera manager 120 may use the drivers and libraries 144, which may include the different drivers and libraries specific to the cameras 151, 152, 153, 154, and 155, to communicate with the cameras 151, 152, 153, 154, and 155. The camera manager 120 may receive image data, including still images and video, from the cameras 151, 152, 153, 154, and 155, and may use the drivers and libraries 144 to read the image data in the format that is native to the camera the image data are received from and store the image data in a format for a common data structures that may be made available to the common camera interface client 181 through endpoints on the camera server computing device 100. The common camera interface client 181 may not need to be aware of the different data types and formats used for images by the cameras 151, 152, 153, 154, and 155 in order to access and display image data that has been stored in the format for the common data structure.

Figure 2:
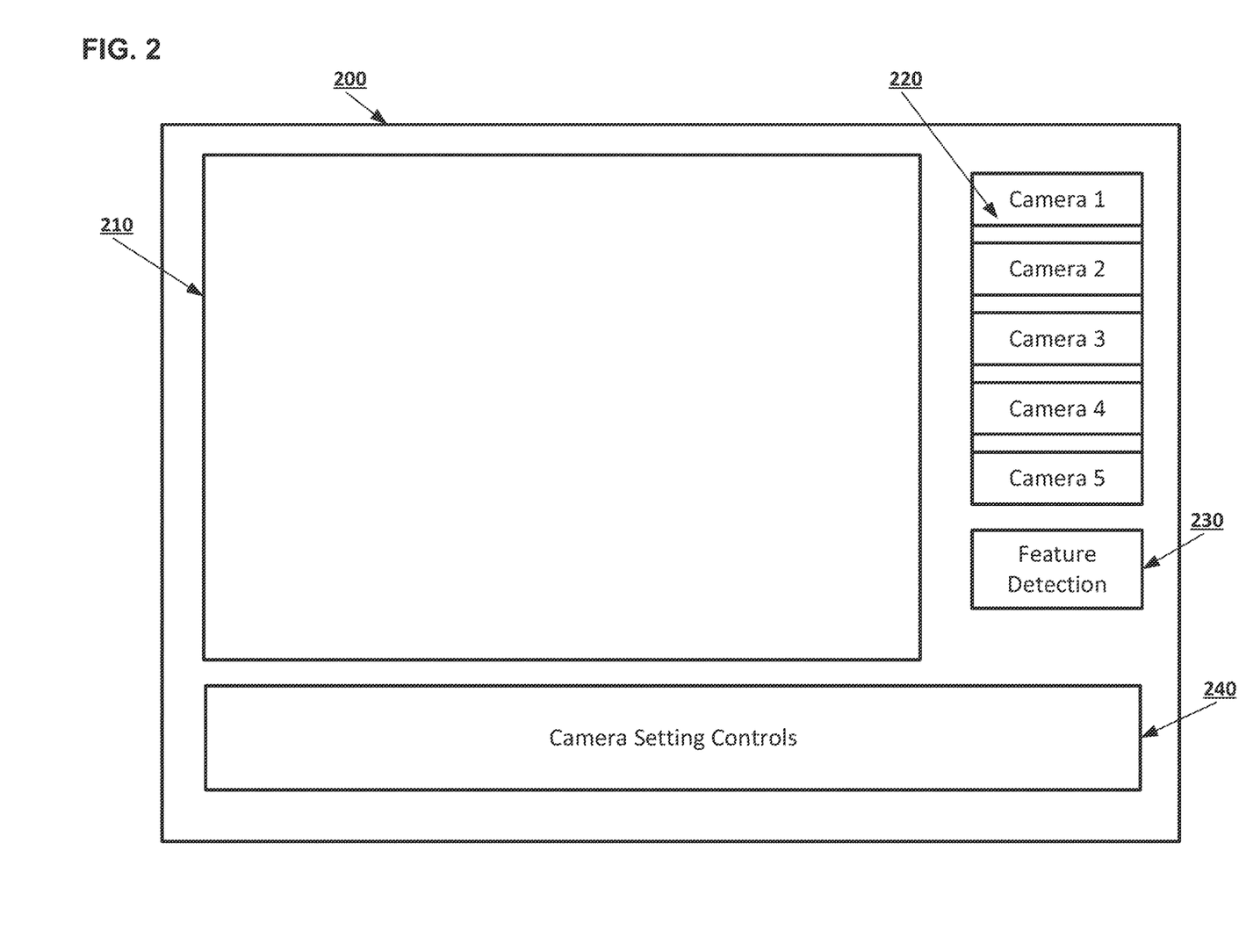
FIG. 2 shows an example user interface suitable for a camera server for heterogeneous cameras according to an implementation of the disclosed subject matter.

FIG. 2 shows an example user interface suitable for a camera server for heterogeneous cameras according to an implementation of the disclosed subject matter. A common camera interface 200 may be a user interface for the cameras of the heterogenous system 150 presented to users through a common camera interface client such as the common camera interface client 181. The common camera interface 200 may appear the same regardless of which camera, for example, from among the cameras 151, 152, 153, 154, and 155, is being accessed through the common camera interface client 181, and regardless of the type of camera. For example, the common camera interface 200 may appear the same for cameras of the trapped ion quantum computer 1000 that are used to observe trapped ions and that are used to monitor the optical systems and laser beams. The common camera interface 200 may include a camera viewport 210. The camera viewport 210 may display image data from the camera being accessed, for example, as a still image, or as a real-time video feed of images. The image data may, for example, be made available at an endpoint by the common camera interface server 110 from the common data structure in which the image data is stored by the camera manager 120. The common camera interface 200 may include various controls, such as a camera selection control 220, feature detection control 230, and camera settings controls 240. The camera selection control 220 may allow a user to select which camera of the heterogenous system 150 to access. By selecting a camera using the camera selection control 220, the user may cause the common camera interface client 181 to connect to an endpoint made available by the common camera interface server 110 for the selected camera, resulting in the camera server computing device 100 to sending image data from the selected camera to the camera viewport 210, and in the common camera interface 200 displaying the current settings for the selected camera in the camera setting controls 240. The user may then be able to change the settings of the selected camera using the camera setting controls 240. The camera setting controls 240 may display the same controls regardless of which camera is selected using the camera selection control 220. The controls may be for common settings for the heterogenous cameras, which may be mapped to camera-specific settings and parameters for each of the heterogenous cameras by the parameter mapping database 142. The feature detection control 230 may allow a user to access various types of image processing and feature detection features that may be used to process the image shown in the camera viewport 210. A user may select an image processing or feature detection feature, which may be applied to the image by the common camera interface server 110 on the camera server computing device 100, allowing image processing to be done on the server-side, rather than relying on the computation power of the client computing device 180. The results of image processing or feature detection feature selected by a user and applied to an image by the common camera interface server 110 may be displayed to the user as processed image data, for example, the image with processing or feature detection applied to it, or may be sent to the client computing device 180 as results data, which may be data about the results of applying the image processing or feature detection to the image but may not include an image to be displayed. For example, analysis may be performed on an image from a camera that observes laser beams of a trapped ion quantum computer. The results of the analysis may be a gaussian distribution, including X-Y coordinates and gaussian weights, which may be sent to the client computing device 180 either with or without the image on which the analysis was performed or any processed version of the image. The common camera interface 200 may also include controls for issuing commands directly to a camera beyond changing the settings and parameters of the camera, for example, instructing the camera to take a still image, perform burst or timed photography, or record video.

Figure 3:
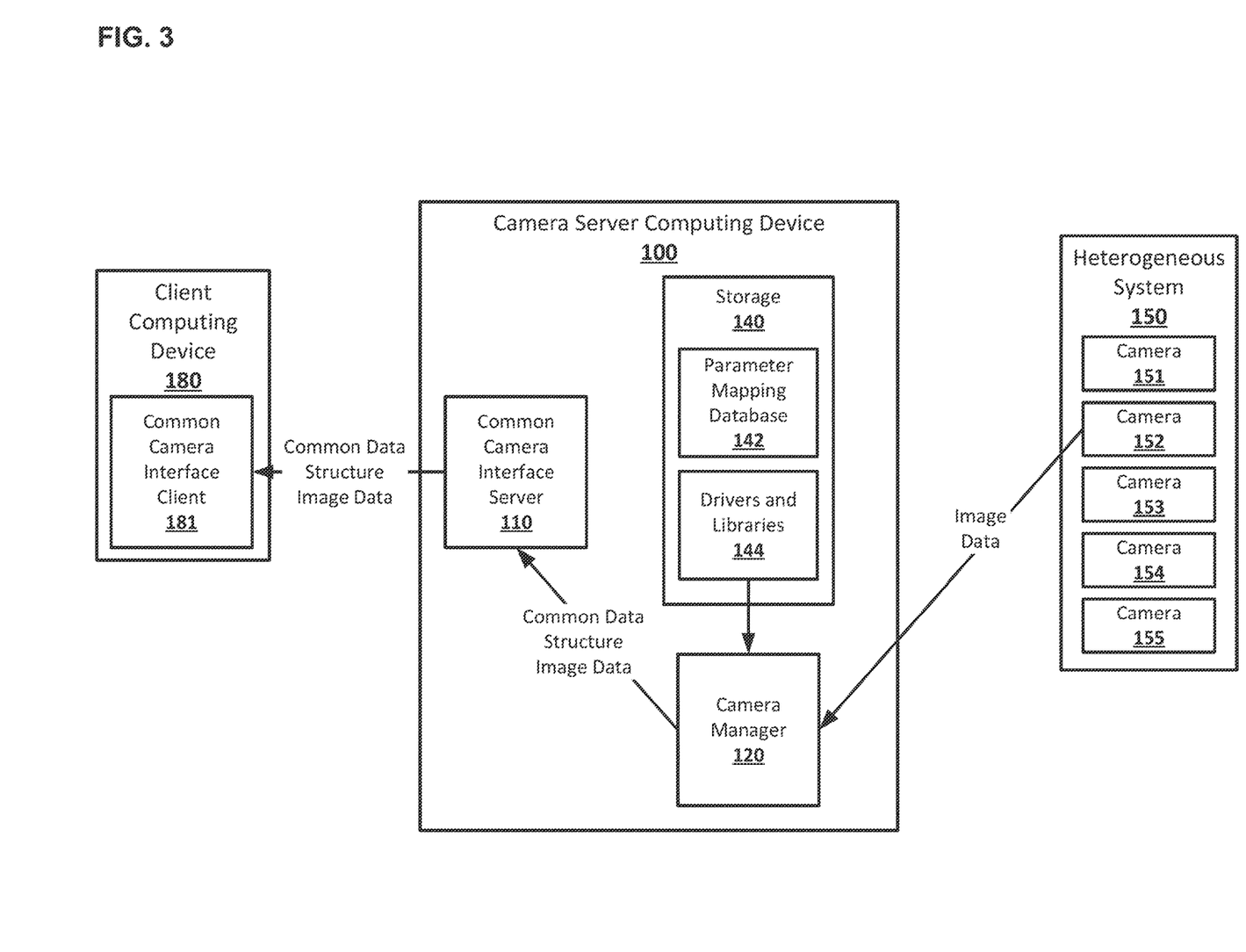
FIG. 3 shows an example arrangement suitable for a camera server for heterogeneous cameras according to an implementation of the disclosed subject matter.

FIG. 3 shows an example arrangement suitable for a camera server for heterogeneous cameras according to an implementation of the disclosed subject matter. The camera server computing device 100 may allow for the client computing device 180 to access images generated by the cameras 151, 152, 153, 154, and 155 of the heterogenous system 150 without the client computing device 180 needing to install drivers or libraries for any of the cameras 151, 152, 153, 154, and 155 or to be aware of any differences among the cameras, which may be of different models and from different manufacturers. The user may use the common camera interface 200, displayed by the common camera interface client 181, to select a camera, such as the camera 152. Image data from the camera 152, including images generated by the camera 152, may be received at the camera server computing device 100 by the camera manager 120. The camera manager 120 may use drivers and libraries for the camera 152 from the drivers and libraries 144 to communicate with the camera 152, read image data from the camera 152, convert the image data to the format for the common data structure that may be used for image data from all of the cameras of the heterogenous system 150, and store the image data in the format for the common data structure. The image data, as stored in the common data structure, may be sent from the common camera interface server 110 to the common camera interface client 181 to be displayed in the camera viewport 210 of the common camera interface 200. The common camera interface server 110 may, for example, connect to an endpoint, such as a TCP endpoint, made available by the common camera interface server 110, that may host the image data in the common data structure from the camera 152. Each of the cameras 151, 152, 153, 154, and 155 may have its own endpoint that may host the image data generated by the camera after the image data is converted into the common data structure by the camera manager 120. If the user switches cameras, for example, selecting the camera 153, the common camera interface client 181 may connect to the endpoint for the selected camera as made available by the common camera interface server 110 and being to receive image data from the selected camera, for example, camera 153. The camera manager 152 may use the appropriate drivers and libraries when communicating with each camera and converting image data to the format for the common data structure, for example, using different libraries and drives to communicate with and read and convert image data from the camera 141 than are used to communicate with and read and convert image data from the camera 145. The camera settings controls 240 may also display the current settings and parameters of the selected camera on the common controls.

Figure 4:
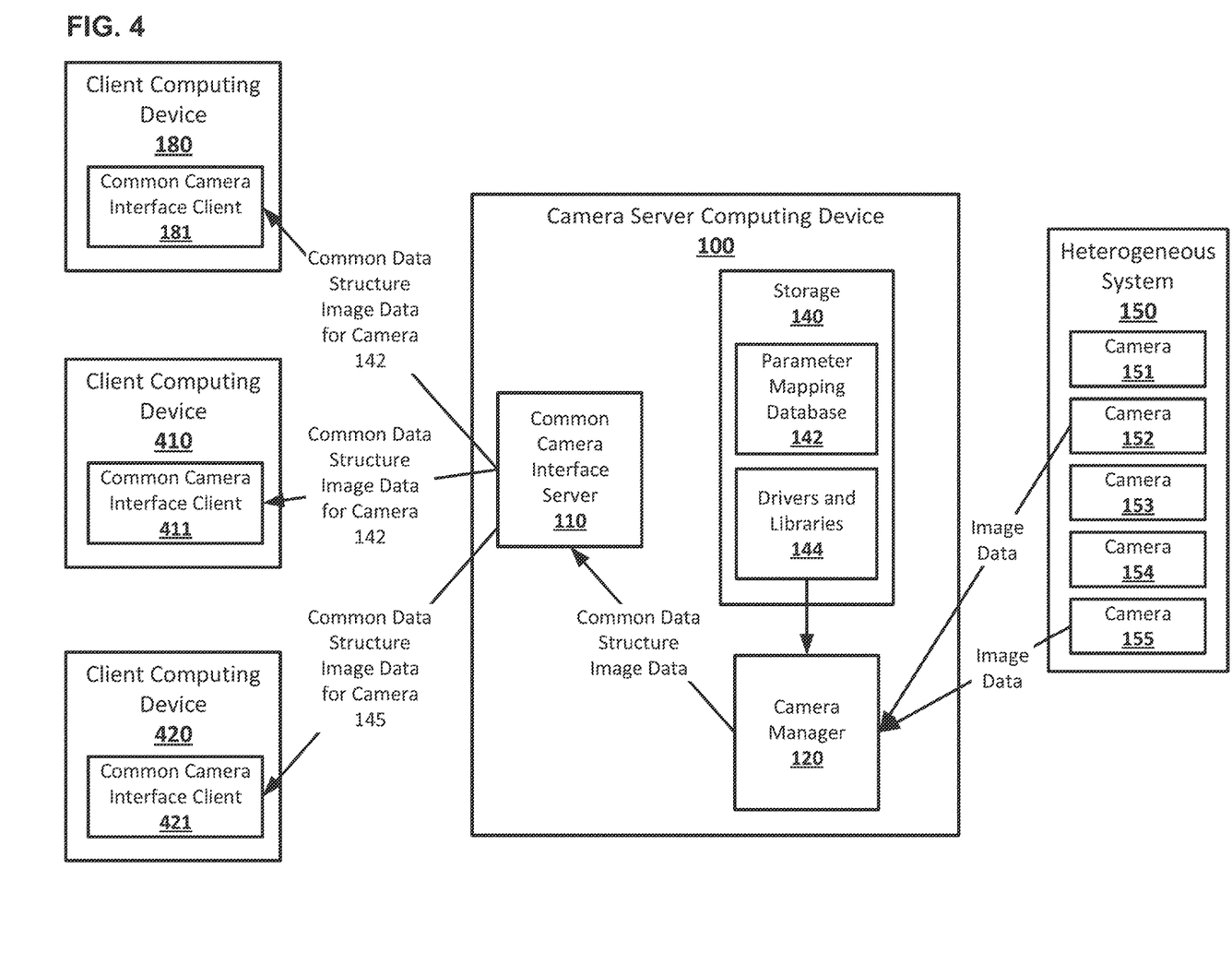
FIG. 4 shows an example arrangement suitable for a camera server for heterogeneous cameras according to an implementation of the disclosed subject matter.

FIG. 4 shows an example arrangement suitable for a camera server for heterogeneous cameras according to an implementation of the disclosed subject matter. The camera server computing device 100 may allow multiple client computing devices to concurrently access the same camera of the heterogenous system 150, and may allow different client computing devices to concurrently access to different cameras. For example, while the client computing device 180 accesses the camera 152, a client computing device 410 may also access the camera 152. The common camera interface client 411 may connect to the same endpoint that hosts the image data for the camera 152 as the common camera interface client 181. The common camera interface server 110 may provide both the common camera interface client 181 and the common camera interface client 411 with real-time image data from the camera 152, as stored in the common data structure by the camera manager 120. Concurrently, a client computing device 420 may access the camera 155. The common camera interface client 421 may connect to the endpoint that hosts image data for the camera 155. The camera manager 120 may receive image data from the camera 155, using driver and libraries for the camera 155 from the driver and libraries 144 to communicate with the camera 155 and convert and store the image data from the camera 155 in the format for the common data structure for image data. The image data from the camera 155 may be made available by the common camera interface server 110 at an endpoint that may be connected to by the common camera interface client 421. The drivers and libraries used by the camera manager 120 to communicate with the camera 155 may be different from the drivers and libraries used by the camera manager 120 to communicate with the camera 152, and the cameras 152 and 155 may be of different model types from the same manufacturer or different manufacturers.

Figure 5:
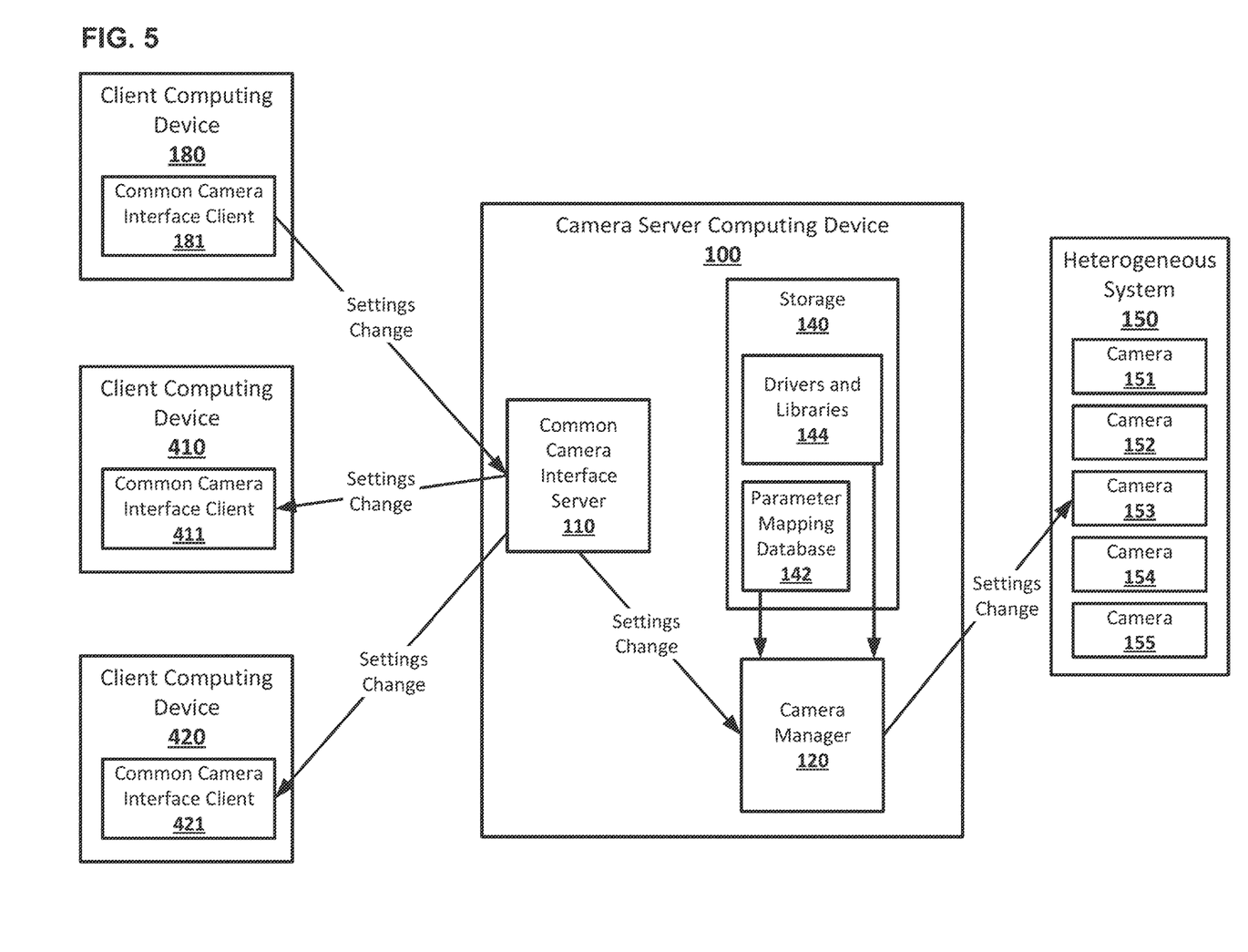
FIG. 5 shows an example arrangement suitable for a camera server for heterogeneous cameras according to an implementation of the disclosed subject matter.

FIG. 5 shows an example arrangement suitable for a camera server for heterogeneous cameras according to an implementation of the disclosed subject matter. The camera server computing device 100 may allow for the settings and parameters of the cameras of the heterogenous system 150 to be changed by a client computing device through the common camera interface 200. Changes made to a camera's settings and parameters by one client computing device may be pushed in real-time to the common camera interface 200 being displayed on other client computing devices accessing that camera. For example, a user may use a control of the camera control settings 240 to change a common setting while accessing the camera 153. The settings change to the common setting may be sent from the common camera interface client 181 to the common camera interface server 110, and then to the camera manager 120. The camera manager 120 may use the parameter mapping database 142 to determine which parameters and settings of the camera 153 correspond to the common setting changed by the control of the camera control settings 240 used by the user of the common camera interface client 181. The camera manager 120 may then communicate with the camera 153, for example, using the drivers and libraries for the camera 153, to change the appropriate settings and parameters on the camera 153 in accordance with the settings change to the common setting made by the user using the control of the camera control settings 240 of the common camera interface client 181. The common camera interface clients 411 and 421 may be concurrently accessing the camera 153 when the settings change is made by the common camera interface client 181. The common camera interface server 110 may, concurrently, push the settings change to the common camera interface clients 411 and 421, which may be connected to the common camera interface server 110 through a full-duplex connection, such as a Web Socket connection, after the camera manager 120 has successfully changed the settings on the camera 153. This may result in the camera control settings 240 as displayed on the common camera interface 200 by both of the common camera interface clients 411 and 421 reflecting the settings changes made using the common camera interface client 181 in real-time without requiring that the common camera interface clients 411 and 421 poll the common camera interface server 110 for settings changes.

Figure 6:
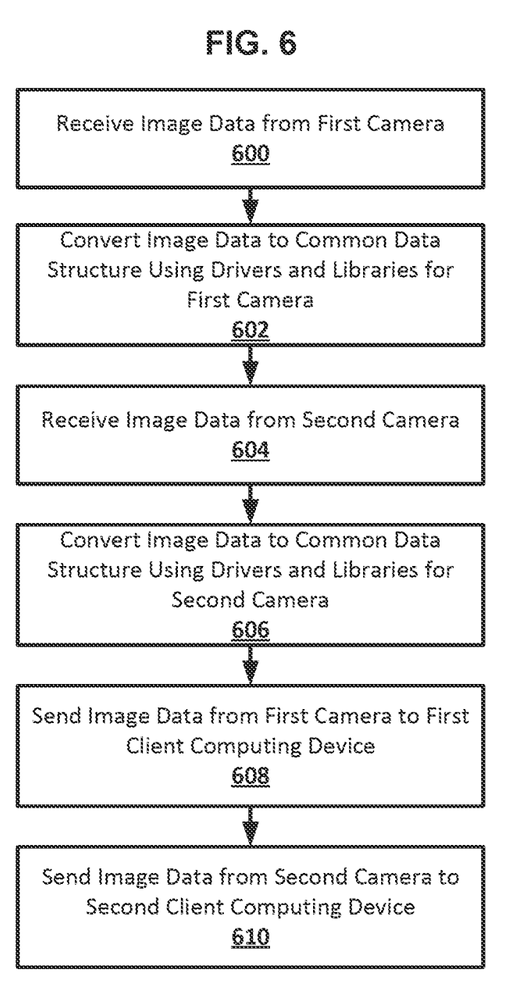
FIG. 6 shows an example procedure suitable for a camera server for heterogeneous cameras according to an implementation of the disclosed subject matter.

FIG. 6 shows an example procedure suitable for a camera server for heterogeneous cameras according to an implementation of the disclosed subject matter. At 600, image data may be received from a first camera. For example, the camera manager 120 on the camera server computing device 100 may receive image data from the camera 152 of the heterogenous system 150. The camera manager 120 may communicate with the camera 152 using, for example, drivers and libraries for the camera 152 from the driver and libraries 144 in the storage 140 of the camera server computing device 100. The image data may be, for example, images from a real-time video feed from the camera 152, or a still image taken by the camera 152.

At 602, image data may be converted to a common data structure using drivers and libraries for the first camera. For example, the camera manager 120 may use the drivers and libraries for the camera 152 to read the image data produced by the camera 152. The camera manager 120 may then convert the image data into a format for a common data structure for image data, which may be any suitable format for image data, including video and still image data.

At 604, image data may be received from a second camera. For example, the camera manager 120 on the camera server computing device 100 may receive image data from the camera 153 of the heterogenous system 150. The camera 153 may, for example, be of a different model type, or from a different manufacturer, than the camera 152. The camera manager 120 may communicate with the camera 153 using, for example, drivers and libraries for the camera 152 from the driver and libraries 144 in the storage 140 of the camera server computing device 100. The driver and libraries for the camera 153 may be different from the drivers and libraries for the camera 152. The image data may be, for example, images from a real-time video feed from the camera 153, or a still image taken by the camera 153.

At 606, image data may be converted to a common data structure using drivers and libraries for the second camera. For example, the camera manager 120 may use the drivers and libraries for the camera 153 to read the image data produced by the camera 153, which may be in a different format than the image data produced by the camera 152. The camera manager 120 may then convert the image data from the camera 153 into the format for the common data structure for image data. The image data from the cameras 152 and 153 may be in the same format after being converted into the format for the common data structure by the camera manager 120.

At 608, image data from the first camera may be sent to a first client computing device. For example, a user may use the common camera interface 200 displayed on the common camera interface client 181 on the client computing device 180 to access the camera 152 through the common camera interface server 110. The common camera interface server 110 may make an endpoint available at which the image data from the camera 152, in the common data structure, may be hosted. The image data may be sent to the common camera interface client 181 to be displayed in the camera viewport 210. The user may use the common camera interface 200 to view the image data as an image, and to process and perform feature detection on the image data. Image processing and feature detection instructed by the user may be performed on the camera server computing device 100, with processed image data being sent back to the common camera interface client 181 to be displayed in the viewport 210.

At 610, image data from the second camera may be sent to a second client computing device. For example, a user may use the common camera interface 200 displayed on the common camera interface client 411 on the client computing device 410 to access the camera 153 through the common camera interface server 110. The common camera interface server 110 may make an endpoint available at which the image data from the camera 153, in the common data structure, may be hosted. The image data may be sent to the common camera interface client 411 to be displayed in the camera viewport 210. The user may use the common camera interface 200 to view the image data as an image, and to process and perform feature detection on the image data. The common camera interface client 411 may access the camera 153 concurrently with the common camera interface client 181 accessing the camera 152. Additional client computing devices may concurrently access the cameras 152 and 153, and the other camera of the heterogenous system 150, through the camera sever computing device 100.

Figure 7:
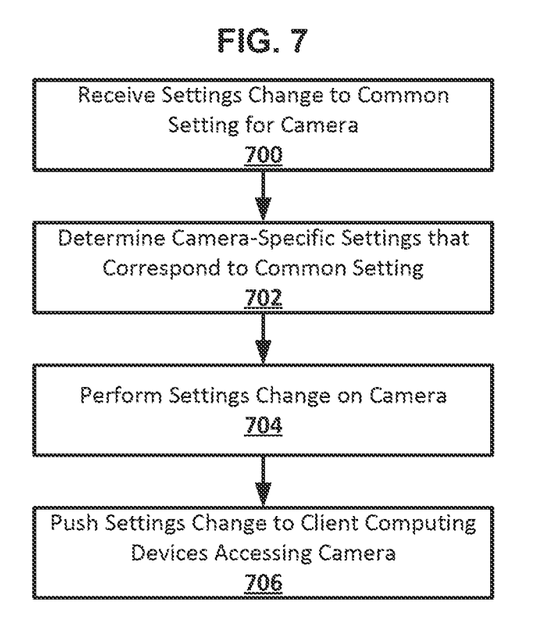
FIG. 7 shows an example procedure suitable for a camera server for heterogeneous cameras according to an implementation of the disclosed subject matter.

FIG. 7 shows an example procedure suitable for a camera server for heterogeneous cameras according to an implementation of the disclosed subject matter. At 700, a settings change for a camera may be received. For example, a user may use a control the camera settings controls 240 to change a setting of the camera 152. The settings change input using the common camera interface 200 may be sent from the common camera interface client 181 to the common camera interface server 110, and then to the camera manager 120. The settings change may be a change to any setting or parameter of the camera 152, and may be received as a change to a common setting or parameter. The common settings or parameters may be settings and parameters controlled by the controls of the camera settings controls 240, and may be the same regardless of which camera of the heterogenous system 150 is being accessed through a common camera interface client.

At 702, the setting of the camera that corresponds to the settings change may be determined. For example, the settings change received from the common camera interface client 181 may be data indicating a change to be made to a common setting, and may not be specific to the settings and parameters used by the camera 152. The camera manager 120 may the parameter mapping database 142 to determine which setting of the camera 152 corresponds to the settings change. For example, the common setting of the settings change may have a different name than the corresponding setting for the camera 152, or implementing a change to the common setting may require changes to multiple different camera-specific settings of the camera 152. The parameter mapping database 142 may include a mapping of common settings to settings and parameters specific to a camera for all of the cameras of the heterogenous system 140, including the camera 152. The same common setting may be mapped differently for different cameras. The camera manager 120 may determine the camera-specific settings and parameters that are mapped to the common setting for which the settings change was received for the camera 152.

At 704, the settings change may be performed on the camera. For example, the camera manager 120, using the driver and libraries for the camera 152, may communicate the settings change to the camera 152. The settings change may be communicated as changes to the camera-specific settings and parameters of the camera 152 that were determined to be mapped to the common setting for which the settings change was received from the common camera interface client 181. This may cause the settings change to the common setting to be implemented on the camera 152 by changing the appropriate camera-specific settings and parameters of the camera 152 as determined through the parameter mapping database 142.

At 706, the settings change may be pushed to client computing devices accessing the camera. For example, other client computing devices, such as the client computing devices 410 and 420, may be accessing the camera 142 concurrently with the client computing device 180. The settings change from the client computing device 180 may be pushed to the common camera interface clients 411 and 421 on the client computing devise 410 and 420 by the common camera interface server 110, for example, over a connection that may allow for full duplex communication. The common camera interface 200 may be updated with the settings change on the common camera interface clients 411 and 421 so that the camera setting controls 240 may be updated to display the settings change, for example, displaying an appropriate value for a common setting reflecting the settings change. For example, if the settings change increases the value of a parameter, and the value of the parameter is displayed as part of the camera settings controls 240, the displayed value may be increased on the common camera interface clients 411 and 421 to reflect the settings change increasing the value made using the common camera interface client 181. This may allow all common camera interface clients that are concurrently accessing the same camera to be updated in real-time with settings changes made by any of the common camera interface clients, so that users are always apprised of the most recent settings for the camera they are accessing without waiting for the common camera interface clients to poll the common camera interface server 110.

Figure 8:
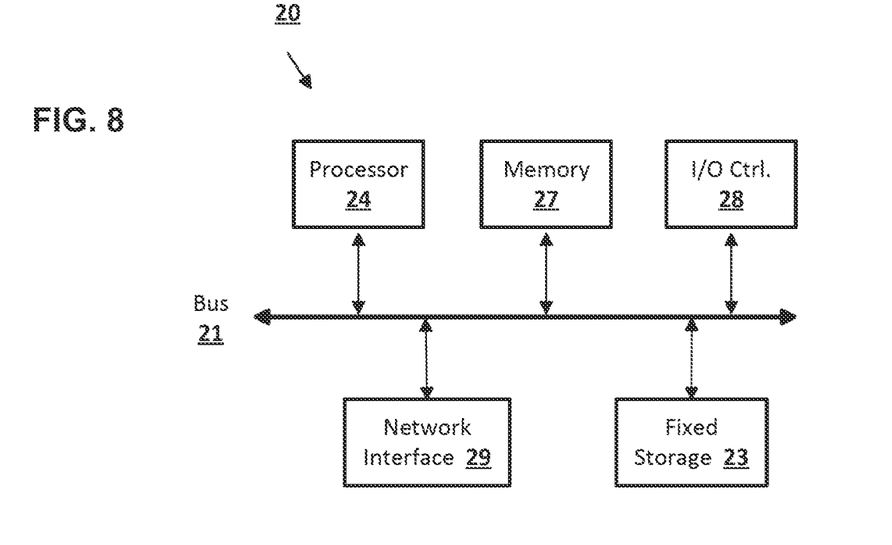
FIG. 8 shows a computer according to an embodiment of the disclosed subject matter.

Embodiments of the presently disclosed subject matter may be implemented in and used with a variety of component and network architectures. FIG. 8 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 9.

Many other devices or components (not shown) may be connected in a similar manner, such as document scanners, digital cameras, auxiliary, supplemental, or backup systems, or the like. Conversely, all of the components shown in FIG. 8 need not be present to practice the present disclosure. The components can be interconnected in different ways from that shown. The operation of a computer such as that shown in FIG. 8 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 9:
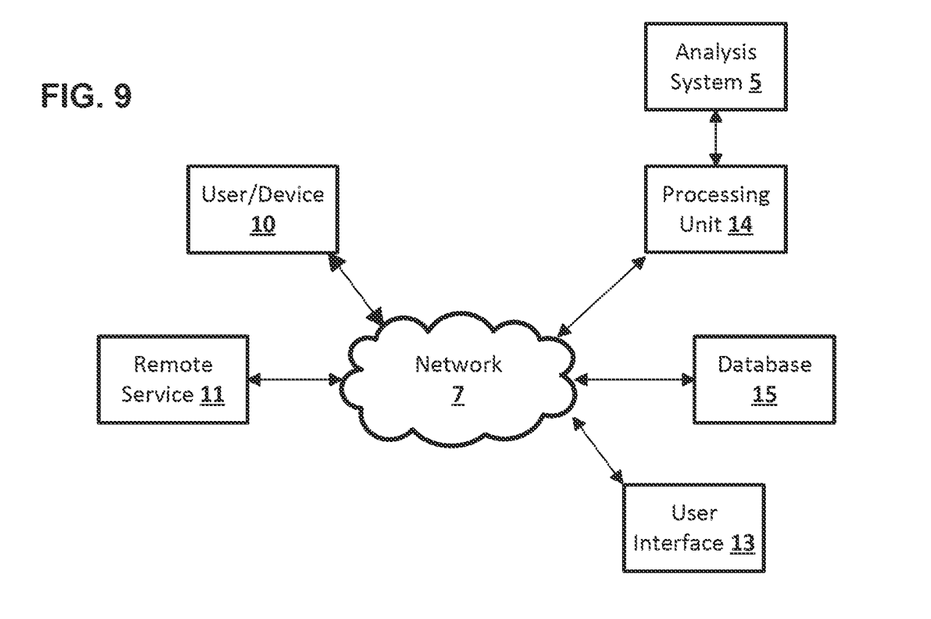
FIG. 9 shows a network configuration according to an embodiment of the disclosed subject matter.

FIG. 9 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

General Hardware Configurations

FIG. 10 shows a partial view of an ion trap quantum computer according to an embodiment of the disclosed subject matter. The ion trap quantum computer, or system 1000, includes a classical (digital) computer 1001, a system controller 1018 and a quantum register that is a chain 1002 of trapped ions (i.e., five shown) that extend along the Z-axis. Each ion in the chain 1002 of trapped ions is an ion having a nuclear spin I and an electron spins such that a difference between the nuclear spin I and the electron spin S is zero, such as a positive ytterbium ion, $^{171}$Yb$^+$, a positive barium ion $^{133}$Ba$^+$, a positive cadmium ion $^{101}$Cd$^+$ or $^{103}$Cd$^+$, which all have a nuclear spin $$I = \frac{1}{2}$$

and the $^2S_{1/2}$ hyperfine states. In some embodiments, all ions in the chain 1002 of trapped ions are the same species and isotope (e.g., $^{171}$Yb$^+$). In some other embodiments, the chain 1002 of trapped ions includes one or more species or isotopes (e.g., some ions are $^{171}$Yb$^+$ and some other ions are $^{133}$Ba$^+$). In yet additional embodiments, the chain 1002 of trapped ions may include various isotopes of the same species (e.g., different isotopes of Yb, different isotopes of Ba). The ions in the chain 1002 of trapped ions are individually addressed with separate laser beams.

The classical computer 1001 includes a central processing unit (CPU), memory, and support circuits (or I/O). The memory is connected to the CPU, and may be one or more of a readily available memory, such as a read-only memory (ROM), a random access memory (RAM), floppy disk, hard disk, or any other form of digital storage, local or remote. Software instructions, algorithms and data can be coded and stored within the memory for instructing the CPU. The support circuits (not shown) are also connected to the CPU for supporting the processor in a conventional manner. The support circuits may include conventional cache, power supplies, clock circuits, input/output circuitry, subsystems, and the like.

An imaging objective 1004, such as an objective lens with a numerical aperture (NA), for example, of 0.37, collects fluorescence along the Y-axis from the ions and maps each ion onto a multi-channel photo-multiplier tube (PMT) 1006 for measurement of individual ions. Non-copropagating Raman laser beams from a laser 1008, which are provided along the X-axis, perform operations on the ions. A diffractive beam splitter 1010 creates an array of static Raman beams 1012 that are individually switched using a multi-channel acousto-optic modulator (AOM) 1014 and is configured to selectively act on individual ions. A global Raman laser beam 1016 illuminates ions at once. In some embodiments, individual Raman laser beams 1016 (not shown) each illuminate individual ions. The system controller (also referred to as a "RF controller") 1018 controls the AOM 1014. The system controller 1018 includes a central processing unit (CPU) 1020, a read-only memory (ROM) 1022, a random access memory (RAM) 1024, a storage unit 1026, and the like. The CPU 1020 is a processor of the RF controller 1018. The ROM 1022 stores various programs and the RAM 1024 is the working memory for various programs and data. The storage unit 1026 includes a nonvolatile memory, such as a hard disk drive (HDD) or a flash memory, and stores various programs even if power is turned off. The CPU 1020, the ROM 1022, the RAM 1024, and the storage unit 1026 are interconnected via a bus 1028. The RF controller 1018 executes a control program which is stored in the ROM 1022 or the storage unit 1026 and uses the RAM 1024 as a working area. The control program will include one or more software applications that include program code (e.g., instructions) that may be executed by a processor in order to perform various functionalities associated with receiving and analyzing data and controlling any and all aspects of the methods and hardware used to create the ion trap quantum computer system 1000 discussed herein.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented system comprising:
a computing device; and
one or more storage devices connected to the computing device wherein the computing device receives image data from a first camera of a trapped ion quantum computer, wherein the first camera observes one or more trapped ions of the trapped ion quantum computer,
receives second image data from a second camera of the trapped ion quantum computer, the second image data comprising a different format than the image data, wherein the second camera observes one or more of optical systems and laser beams of the trapped ion quantum computer, and wherein the first camera is of a different type than the second camera,
converts the image data and the second image data into a format for a common data structure for image data,
sends the image data in the format for the common data structure for image data to one or more client computing devices, and
sends the second image data in the format for the common data structure for image data to one or more additional client computing devices.

2. The system of claim 1, wherein the image data in the format for the common data structure for image data is hosted at a first endpoint on the computing device, and wherein the image data in the format for the common data structure for image is hosted at a second endpoint on the computing device.

3. The system of claim 1, wherein the computing device is a camera server that runs a common camera interface server, and wherein the one or more client computing devices and the one or more additional client computing devices access a common camera interface through a connection with the common camera interface server.

4. The system of claim 3, wherein the common camera interface comprises controls for changing common settings for the first camera and the second camera.

5. The system of claim 1, wherein the computing device receives a settings change for a common setting for the first camera from one of the one or more client computing devices;
determines camera-specific settings for the first camera that are mapped to the common setting,
sends changes to the camera-specific settings for the first camera to the first camera to implement the settings change to the common setting for the first camera, and
sends the settings change to at least one of the one or more client computing devices.

6. The system of claim 5, wherein the computing device sends the settings change to the at least one of the one or more client computing devices by pushing data with the settings change to a common camera interface client running on the at least one of the one or more client computing devices.

7. The system of claim 1, wherein the computing device includes drivers for the first camera and drivers for the second camera, wherein the drivers for the first camera are different from the drivers for the second camera, and wherein the computing device uses the drivers for the first camera to communicate with the first camera and the drivers for the second camera to communicate with the second camera.

8. The system of claim 1, wherein the computing device further receives from one of the client computing devices a selection of an image processing or feature detection feature to apply to the image data,
applies the selected image processing or feature detection feature to the image data, and
sends one or both of processed image data and results data resulting from applying the selected image processing or feature detection feature to the image data to the one of the client computing devices.

9. The system of claim 1, wherein the computing device receives a request from one of the one more client computing devices for the second image data from the second camera, and
sends the second image data in the format for the common data structure for image data to the one of the one or more client computing devices that requested the second image data and stops sending the image data in the format for the common data structure to the one of the one or more client computing devices that request the second image data.

10. The system of claim 1, wherein the computing device receives image data from the first camera and image data from the second camera in real time.

11. A computer-implemented method performed data apparatus comprising:
receiving, by a computing device, image data from a first camera of a heterogenous system;

receiving, by the computing device, second image data from a second camera of the heterogenous system, the second image data comprising a different format than the image data;

converting, by the computing device, the image data and the second image data into a format for a common data structure for image data;

sending, by the computing device, the image data in the format for the common data structure for image data to one or more client computing devices; and sending, by the computing device, the second image data in the format for the common data structure for image data to one or more additional client computing devices.

12. The method of claim 11, wherein the image data in the format for the common data structure for image data is hosted at a first endpoint on the computing device, and wherein the image data in the format for the common data structure for image is hosted at a second endpoint on the computing device.

13. The method of claim 11, wherein the computing device is a camera server that runs a common camera interface server, and wherein the one or more client computing devices and the one or more additional client computing devices access a common camera interface through a connection with the common camera interface server.

14. The method of claim 13, wherein the common camera interface comprises controls for changing common settings for the first camera and the second camera.

15. The method of claim 11, further comprising:
receiving, by the computing device, a settings change for a common setting for the first camera from one of the one or more client computing devices;

determining, by the computing device, camera-specific settings for the first camera that are mapped to the common setting;

sending, by the computing device, changes to the camera-specific settings for the first camera to the first camera to implement the settings change to the common setting for the first camera; and sending, by the computing device the settings change to at least one of the one or more client computing devices.

16. The method of claim 15, wherein sending, by the computing device, the settings change to the at least one of the one or more client computing devices further comprises pushing, by the computing device, data with the settings change to a common camera interface client running on the at least one of the one or more client computing devices.

17. The method of claim 11, wherein the computing device includes drivers for the first camera and drivers for the second camera, wherein the drivers for the first camera are different from the drivers for the second camera, and wherein the computing device uses the drivers for the first camera to communicate with the first camera and the drivers for the second camera to communicate with the second camera.

18. The method of claim 11, further comprising:
receiving, by the computing device, from one of the client computing devices a selection of an image processing or feature detection feature to apply to the image data, applying, by the computing device, the selected image processing or feature detection feature to the image data; and sending, by the computing device, processed image data resulting from applying the selected image processing or feature detection feature to the image data to the one of the client computing devices.

19. The method of claim 11, further comprising:
receiving, by the computing device, a request from one of the one more client computing devices for the second image data from the second camera; and sending, by the computing device, the second image data in the format for the common data structure for image data to the one of the one or more client computing devices that requested the second image data and stops sending the image data in the format for the common data structure to the one of the one or more client computing devices that request the second image data.

20. The method of claim 11, wherein the computing device receives image data from the first camera and image data from the second camera in real time.

21. A computer-implemented system comprising:
a computing device; and
one or more storage devices connected to the computing device wherein the computing device receives image data from a first camera of a heterogenous system, receives second image data from a second camera of the heterogenous system, the second image data comprising a different format than the first image data, converts the image data and the second image data into a format for a common data structure for image data, sends the image data in the format for the common data structure for image data to one or more client computing devices, and sends the second image data in the format for the common data structure for image data to one or more additional client computing devices.

* * * * *